United States Patent [19]

Gaillard

[11] Patent Number: 5,751,880
[45] Date of Patent: May 12, 1998

[54] OPTICAL UNIT FOR AN OPTICAL FIBER TELECOMMUNICATIONS CABLE, AND AN OPTICAL FIBER CABLE INCLUDING SUCH A UNIT

[75] Inventor: Pierre Gaillard, Puteaux, France

[73] Assignee: Alcatel Cable France, Clichy Cedex, France

[21] Appl. No.: 733,447

[22] Filed: Oct. 18, 1996

[30] Foreign Application Priority Data

Oct. 20, 1995 [FR] France .................. 95 12367

[51] Int. Cl.⁶ .................................... G02B 6/44
[52] U.S. Cl. ................. 385/109; 385/103; 385/104; 385/106; 385/111; 385/112; 385/113; 385/115
[58] Field of Search ............... 385/100–114, 115

[56] References Cited

U.S. PATENT DOCUMENTS 4,645,298  2/1987  Gardtside, III ............... 350/96.23
4,909,593  3/1990  Harbort et al. ............... 350/96.23

FOREIGN PATENT DOCUMENTS

0468878A1  1/1992  European Pat. Off. .
0518738A1  12/1992  European Pat. Off. .
2280911  2/1976  France .

Primary Examiner—John Ngo
Attorney, Agent, or Firm—Sughrue, Mion, Zinn, Macpeak & Seas, PLLC

[57] ABSTRACT

The present invention relates to an optical unit for an optical fiber telecommunications cable, the unit comprising a tube of a plastics material in which at least one optical fiber is loosely received, wherein the thickness of said tube is less than or equal to 0.5 mm, and wherein said material has a modulus of elasticity less than 1500 MPa at 20° C. and a stress/elongation curve without a yield point.

11 Claims, 2 Drawing Sheets

OPTICAL UNIT FOR AN OPTICAL FIBER TELECOMMUNICATIONS CABLE, AND AN OPTICAL FIBER CABLE INCLUDING SUCH A UNIT

The present invention relates in general to a unit containing optical fibers and intended for use in an optical fiber telecommunications cable; more particularly, it relates to the material of the tube and to the dimensions of such a unit containing optical fibers.

BACKGROUND OF THE INVENTION

FIGS. 1 and 2 are cross-sections through two prior art cables respectively having the so-called "Unitube®" structure (FIG. 1) and the so-called "stranded loose tube" structure (FIG. 2). A prior art stranded loose tube structure is described, for example in document FR-2 280 911.

Optical fiber cables 10 and 20 comprise optical fibers 2 in the form of a bundles or ribbons that are loosely received either in a tube 3 whose longitudinal axis coincides with that of the cable (Unitube® structure) or in a plurality of tubes 3 wound around a central reinforcing element 1 of dielectric material (stranded loose tube structure). An optical unit 5 comprises a tube 3 together with the optical fiber(s) 2 it contains.

Around the unit 5 of the Unitube® structure cable 10 or around the set of units 5 of the stranded loose tube structure cable 20, there are disposed in succession a mechanical reinforcing layer 6, e.g. constituted by dielectric reinforcing elements, and an outer protective sheath 7 of insulating material. In addition, the empty spaces between the units 5 of the cable 20 can be filled with a material 4 that performs longitudinal sealing or that contains elements that swell in the presence of liquid to provide such sealing.

Conventionally, the tubes 3 of units 5 containing optical fibers 2 are made of a material that is hard and rigid, such as high density polyethylene (HDPE) or polybutylene terephthalate (PBT); they may also be made of a pair of layers comprising polybutylene terephthalate and polycarbonate (PBT/PC). According to document FR-2 280 911, tubes for the stranded loose tube structure can also be made of polyethylene or of polypropylene.

In known cables 10 or 20 the modulus of elasticity of the material constituting the tubes 3 is generally high, being of the order of 2400 MPa to 2600 MPa at 20° C. Such tubes confer good mechanical protection to the optical fibers 2, in particular against radial compression forces. When this modulus of elasticity is smaller, the tubes must be quite thick in order to provide the cable with good strength against radial compression. Under such circumstances, the thickness of the tubes 3 is relatively large (typically about 0.5 mm for stranded loose tube structures and about 0.75 mm for Unitube® structures). Thus, the resulting cables 10 or 20 are either very bulky, or rigid, or both simultaneously, and consequently they are difficult to handle.

Also, although a tube 3 made of a material having a high modulus of elasticity gives good mechanical protection against radial compression forces, it is irreversibly damaged in the event of radial compression stress (crushing or shock) being applied thereto in excess of a limiting threshold.

In addition, when a prior art unit is subjected to bending stress, it may suffer from kinking. For a given ratio of outside diameter to inside diameter, this effect increases with the hardness of the tubes 3.

Finally, in stranded loose tube structure cables 20, because of the "memory" of the tubes 3, due to their being wound around the central reinforcing element 1, splicing operations are difficult.

OBJECT AND SUMMARY OF THE INVENTION

The object of the present invention is thus to overcome the drawbacks due to the use of rigid materials while avoiding those due to the use of tubes of large thickness. In particular, the object of the invention is to make it possible to make cables that are less bulky and easier to handle than prior art cables.

To this end, the invention proposes using materials that are flexible and elastic for the tube(s) of the optical fiber unit(s); in particular, it proposes an optical unit for an optical fiber telecommunications cable, the unit comprising a tube of a plastics material in which at least one optical fiber is loosely received, wherein the thickness of said tube is less than or equal to 0.5 mm, and wherein said material has a modulus of elasticity less than 1500 MPa at 20° C. and a stress/elongation curve without a yield point.

The thickness of the tube is preferably less than or equal to 0.3 mm for a stranded loose tube structure cable, and less than or equal to 0.5 mm in a Unitube® structure cable.

By using a material that is flexible and elastic and of small thickness of the tube, a cable containing one or more units of the invention is more flexible than a cable using prior art units, thereby making handling thereof easier.

Surprisingly, even if the material constituting the tube(s) has a small modulus of elasticity and even if the tube(s) is/are thin, such tubes are not damaged when radial compression stress (crushing or shock) is applied thereto. In a unit of the invention, the tube returns to its initial shape elastically after the stress has been released.

In addition, the units of the invention withstand kinking better than units comprising tubes that are more rigid.

Also, the smaller thickness of the tube compared with the prior art makes it possible for a cable containing one or more units of the invention to be less bulky.

Because of their flexibility, tubes of the invention have greatly reduced "memory", thereby facilitating splicing operations on stranded loose tube structure cables.

Finally, selecting a material of the invention makes it possible to make cables that are smaller in size, thereby leading to a reduction in cable costs.

BRIEF DESCRIPTION OF THE DRAWINGS

Other characteristics and advantages of the present invention appear more clearly on reading the following description, given with reference to the corresponding accompanying drawings, in which.

In all of the figures, elements that are common are given the same reference numerals. The figures are drawn to the same scale.

MORE DETAILED DESCRIPTION

Figure 1:
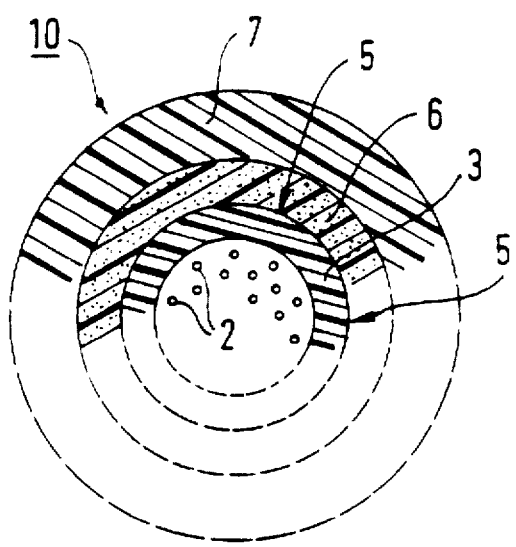
FIG. 1 is a diagrammatic fragmentary section of a prior art Unitube® structure cable.
Figure 2:
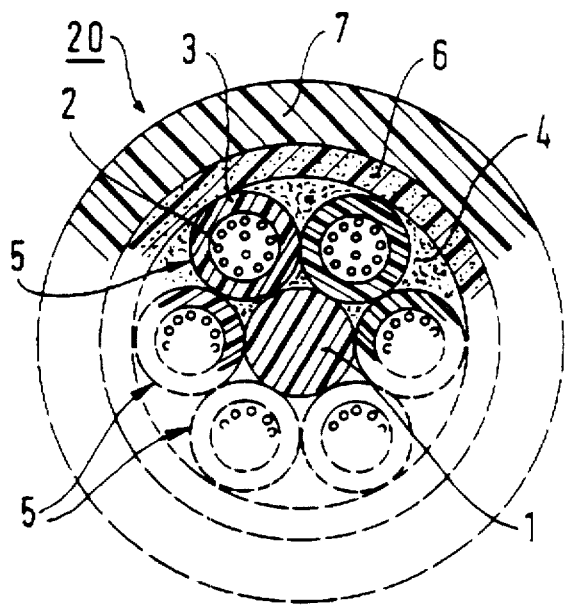
FIG. 2 is a diagrammatic fragmentary section of a prior art stranded loose tube structure cable.

FIGS. 1 and 2 have been described with reference to the prior art.

Figure 3:
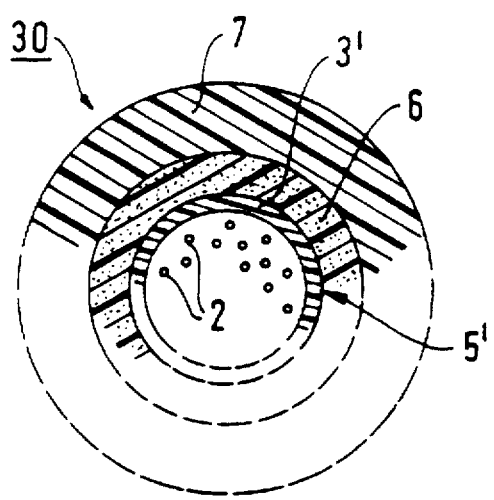
FIG. 3 is a diagrammatic fragmentary section of a Unitube® structure cable of the present invention.

FIG. 3 is a cross-section through a Unitube® structure optical fiber telecommunications cable 30 including an optical unit 5' of the present invention. Cable 30 is built in the same manner as the cable 10 of FIG. 1 and includes the same number of optical fibers, the difference being that the material used for the tube 3' is flexible and its thickness can be smaller than that of the tube 3 of the cable 10 in FIG. 1.

Figure 4:
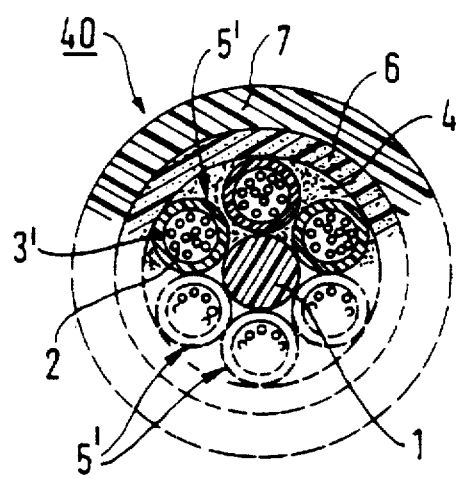
FIG. 4 is a diagrammatic fragmentary section of a stranded loose tube structure cable of the present invention.

FIG. 4 is a cross-section through an optical fiber telecommunications cable 40 having a plurality of optical units 5' of the present invention. The cable 40 is built in the same manner as the cable 20 of FIG. 2 and it has the same number of optical fibers 2, the difference being that the material used for the tubes 3' is flexible and they can be thinner than those used for the cable 20 of FIG. 2.

The material of the tube(s) 3' has a modulus of elasticity of less than 1500 MPa at 20° C., and the thickness of the tubes 3' is preferably less than or equal to 0.5 mm (preferably less than or equal to 0.3 mm in the cable 40 and less than or equal to 0.5 mm in the cable 30). The tube(s) 3' can be made of a material such as polyethylene, polypropylene, or polyvinyl chloride (PVC), for example.

Figure 5:
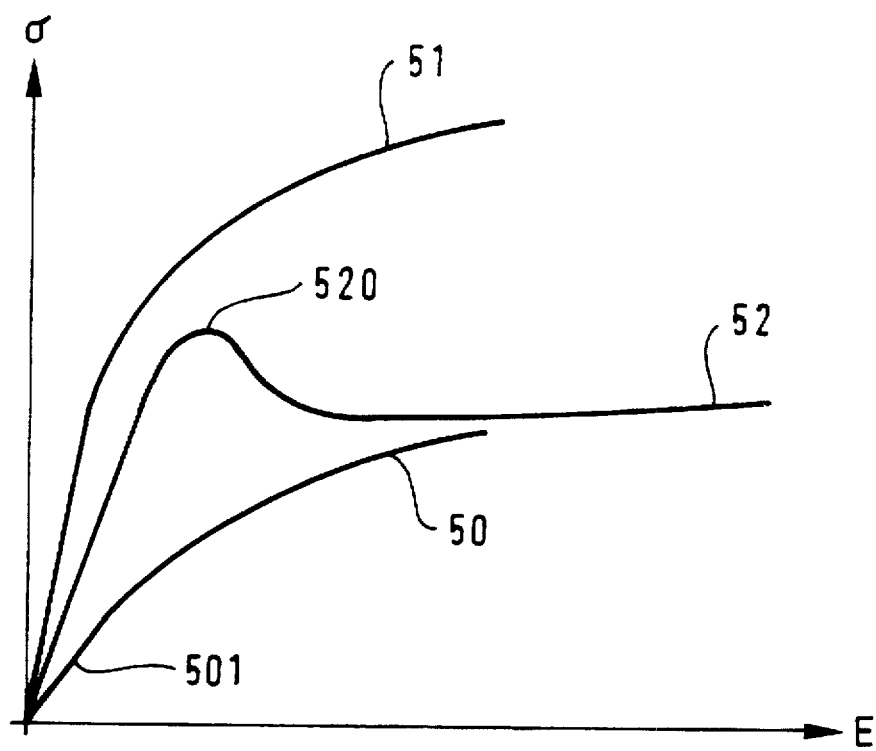
FIG. 5 shows stress as a function of elongation for a material that is suitable for use in a tube of the invention.

In general, any material having a modulus of elasticity less than 1500 MPa at 20° C. and such that its stress/elongation ($\sigma/E$) curve 50 (see FIG. 5) does not have a yield point, i.e. does not have a maximum after the elastic stage 501 (where there is a linear relationship between stress and elongation, elongation being proportional to stress where the proportionality factor is equal to the modulus of elasticity of the material). This means that the material does not have a threshold beyond which a substantially constant level of stress gives rise to major plastic deformation. As an illustration, curve 51 applies to a material having a high modulus of elasticity and no yield point, and curve 52 applies to a material having an intermediate modulus of elasticity with a yield point 520.

As can be seen by comparing FIGS. 1 and 3 or FIGS. 2 and 4, the smaller thickness of the tube(s) 3' makes it possible to make cables 30 and 40 of dimensions that are smaller than those of the corresponding cables 10 and 20 of the prior art, for a constant number of optical fibers 2. This makes it possible to use smaller thickness for the mechanical reinforcements 6 and for the outer sheath 7, and above all to reduce the diameter of the central reinforcing element 1 of stranded loose tube structure cables.

By way of example, the prior art cable 10 of FIG. 1 contains 48 optical fibers 2 occupying a tube 3 having an outside diameter of 6 mm and an inside diameter of 4.5 mm, i.e. a thickness of 0.75 mm. The outside diameter of the cable 10 is 12 mm. With the same number of optical fibers, the cable 30 of the invention as shown in FIG. 3 contains a tube 3' having an outside diameter of 5 mm and an inside diameter of 4.5 mm, i.e. it has a thickness of 0.25 mm and the outside diameter of the cable 30 is 11 mm.

A prior art Unitube® cable can also contain 96 optical fibers collected together in ribbons within a tube having a thickness of 1 mm. A corresponding cable of the invention containing 96 fibers grouped together in ribbons has a tube with a thickness of 0.4 mm.

Also by way of example, prior art cable 20 of FIG. 2 contains 72 optical fibers shared between six tubes 3 each having an outside diameter of 2.8 mm and an inside diameter of 1.8 mm, i.e. having a thickness of 0.5 mm. The outside diameter of the cable 20 is 14 mm. With the same number of optical fibers, the cable 40 of the invention as shown in FIG. 4 contains six tubes each having an outside diameter of 2 mm and an inside diameter of 1.5 mm, i.e. having a thickness of 0.25 mm, and the outside diameter of the cable 40 is 10 mm.

Similarly, a cable of the invention having dimensions equal to those of a comparable prior art cable can contain more optical fibers than does the prior art cable.

Naturally, the present invention is not limited to the embodiments described above. In particular, optical fibers could be replaced by ribbons in units of the invention or indeed a single unit could have both individual fibers and ribbons.

The tube can be made of any material providing it satisfies the specified mechanical characteristics.

The tubes 3' of the units 5' could also contain a material providing sealing in the form of a gel (e.g. in cord or ribbon form) while still enabling the fibers or ribbons of fibers to move inside the tubes.

I claim:

1. An optical unit for an optical fiber telecommunications cable, the unit comprising a tube of a plastics material in which at least one optical fiber is loosely received, wherein the thickness of said tube is less than or equal to 0.5 mm, and wherein said material has a modulus of elasticity less than 1500 MPa at 20° C. and a stress/elongation curve without a yield point.

2. An optical unit according to claim 1, wherein said plastics material is selected from polyethylene, polypropylene, and PVC.

3. An optical unit according to claim 1, wherein a plurality of optical fibers are housed in said tube in the form of bundles.

4. An optical unit according to claim 1, wherein a plurality of optical fibers are housed inside said tube in the form of ribbons.

5. An optical unit according to claim 1, further comprising a sealing material in gel form contained inside said tube without preventing said at least one optical fiber from moving within said tube.

6. An optical fiber telecommunications cable, comprising at least one unit according to claim 1.

7. A telecommunications cable according to claim 6, comprising a single unit extending along its own longitudinal axis.

8. A telecommunications cable according to claim 7, wherein the thickness of said tube is less or equal to 0.3 mm.

9. A telecommunications cable according to claim 6, comprising a plurality of units wound around a central reinforcing element.

10. A telecommunications cable according to claim 9, wherein the thickness of the tube in each unit is less than or equal to 0.3 mm.

11. A telecommunications cable according to claim 6, including a mechanical reinforcing layer surrounding said at least one unit and an outer protective sheath surrounding said mechanical reinforcing layer.

* * * * *